United States Patent [19]

Masin

[11] Patent Number: 4,964,021

[45] Date of Patent: Oct. 16, 1990

[54] MOTOR VEHICLE HEADLIGHT

[75] Inventor: Valter Masin, Turin, Italy

[73] Assignee: Carello S.p.A., Turin, Italy

[21] Appl. No.: 439,496

[22] Filed: Nov. 21, 1989

[51] Int. Cl.[5] .......... B60Q 1/04

[52] U.S. Cl. .......... 362/61; 362/302; 362/303; 362/346; 362/347

[58] Field of Search .......... 362/61, 80, 297, 298, 362/299, 300, 302, 303, 346, 347

[56] References Cited

U.S. PATENT DOCUMENTS

| | | | |
|---|---|---|---|
| 4,800,467 | 1/1989 | Lindae et al. | 362/303 X |
| 4,851,968 | 7/1989 | Nino | 362/61 |
| 4,879,636 | 11/1989 | Yamagishi et al. | 362/61 |

*Primary Examiner*—Stephen F. Husar
*Attorney, Agent, or Firm*—Klauber & Jackson

[57] ABSTRACT

A motor vehicle headlight having a reflecting body which consists of a paraboloid of translation with inclined lateral end walls characterized by the fact that a spherical reflector is formed centrally on the paraboloid. A condensing lens is located ahead of the light source and a diaphragm is situated between the light source and condensing lens. The focus points of the condensing lens and spherical reflector are located between the light source and diaphragm.

3 Claims, 3 Drawing Sheets

MOTOR VEHICLE HEADLIGHT

The present invention relates to a motor vehicle headlight.

SUMMARY OF THE INVENTION

The aim of the present invention is to provide a headlight capable of employing the light source to full capacity, and providing an extra-wide light pattern designed to eliminate glare.

With this aim in view, according to the present invention, there is provided a motor vehicle headlight comprising a reflecting body, in turn comprising a paraboloid of translation with inclined lateral end walls, and a light source located centrally along the focal axis of said paraboloid; characterised by the fact that it also comprises a spherical reflector formed centrally on said paraboloid and behind said light source; a condensing lens located ahead of said light source; and a diaphragm located between said condensing lens and said light source; the respective focus points of said condensing lens and said spherical reflector being located between said diaphragm and said light source.

BRIEF DESCRIPTION OF THE DRAWINGS

A non-limiting example of the present invention will be described with reference to the accompanying drawings, in which:

FIG. 6 shows a similar view to that in FIG. 4, but relative to a variation of the FIG. 1 headlight.

DETAILED DESCRIPTION OF THE INVENTION

Figure 3:
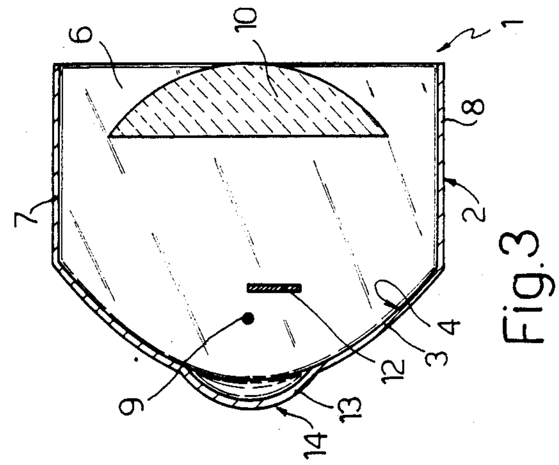
FIG. 3 shows a section along line III-III in FIG. 1.
Figure 1:
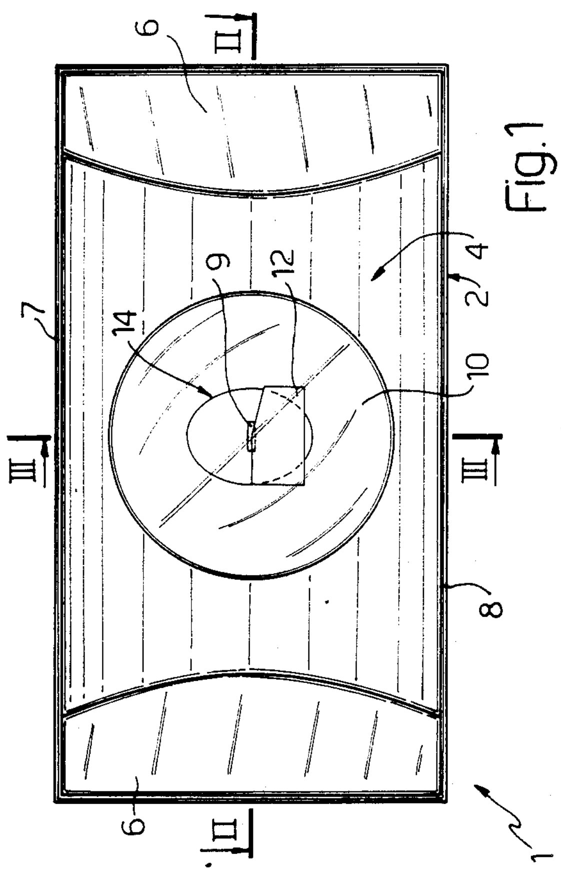
FIG. 1 shows a schematic front view of a preferred embodiment of the headlight according to the present invention.
Figure 2:
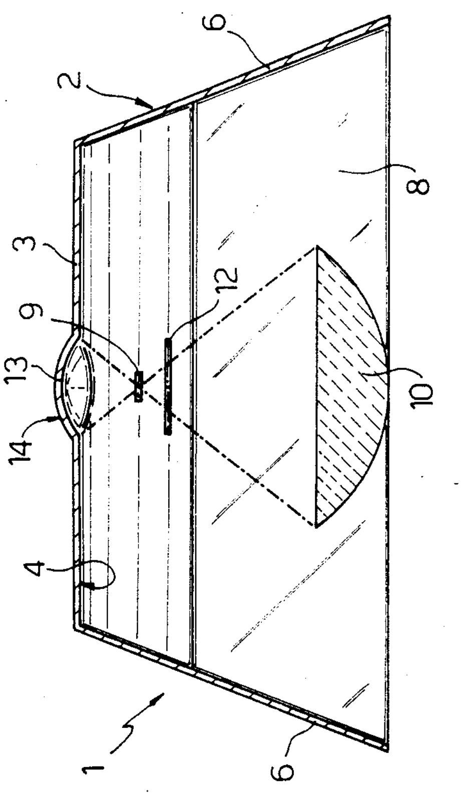
FIG. 2 shows a section along line II-II in FIG. 1.
Figure 4:
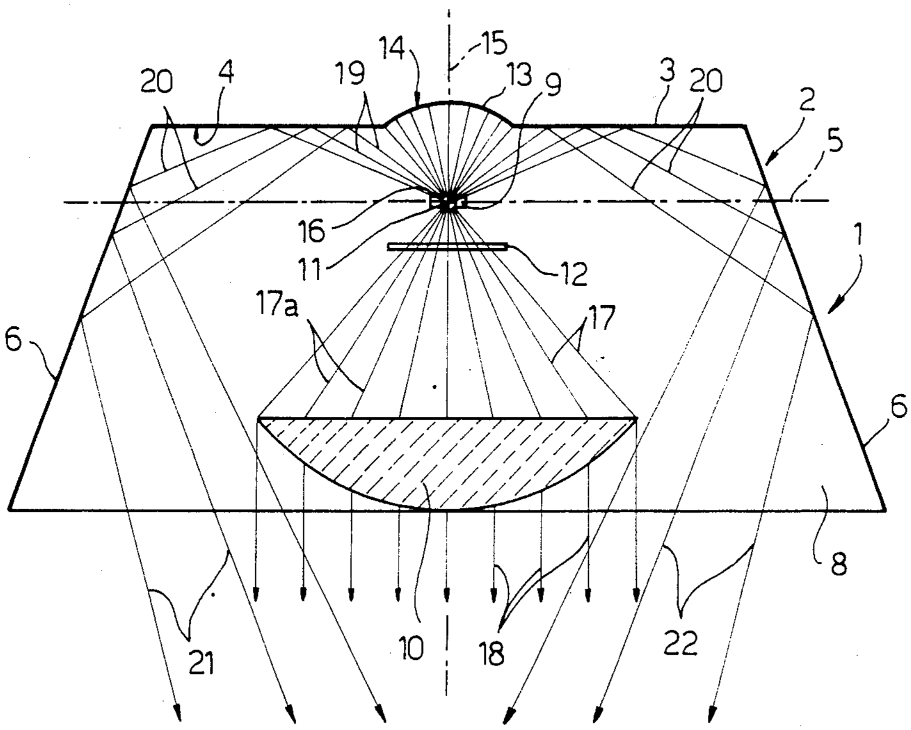
FIG. 4 shows a schematic functional version of FIG. 2.

Number 1 in FIGS. 1, 2 and 3 indicates a motor vehicle headlight comprising a reflecting body 2, in turn comprising a rear wall 3, the inner surface 4 of which is in the form of a paraboloid of translation having a substantially horizontal focal axis 5 (FIG. 4). Reflecting body 2 also comprises two inclined lateral end walls 6, and substantially horizontal top and bottom walls 7 and 8 blending respectively with the top and bottom ends of wall 3, and processed in such a manner as to be non-reflecting.

Headlight 1 also comprises a lamp 9 having a filament extending substantially along the central portion of axis 5; a condensing lens 10 located ahead of lamp 9 and having a focus point 11 (FIG. 4) on axis 5; and a diaphragm 12 located between lens 10 and lamp 9.

Rear wall 3 presents a central recessed portion 13 in the form of a spherical bowl and defining a spherical reflector 14, the optical axis 15 of which coincides with the optical axis of lens 10, and the focus point 16 (FIG. 4) of which is located on axis 5, substantially coinciding with focus point 11.

As shown in FIG. 4, in actual use, lamp 9 emits a first set of direct rays 17, which are partially intercepted by diaphragm 12, and strike lens 10 from which they emerge in the form of a set of rays 18 parallel to axis 15.

Lamp 9 also emits a second set of rays 19 which, on striking the spherical surface of reflector 14, are reflected back once, so as to form a virtual image of the filament of lamp 9 at focus point 16 which, in this particular case, coincides with the filament of lamp 9. Said virtual image produces a set of rays 17*a*, which are added to rays 17 and, consequently also, rays 18.

Lamp 9 also emits a third set of rays 20 which are reflected twice, first on surface 4 and then on the inner reflecting surface of respective wall 6, and emerge in the form of two sets of converging rays 21 and 22, which do not strike lens 10.

Figure 5:
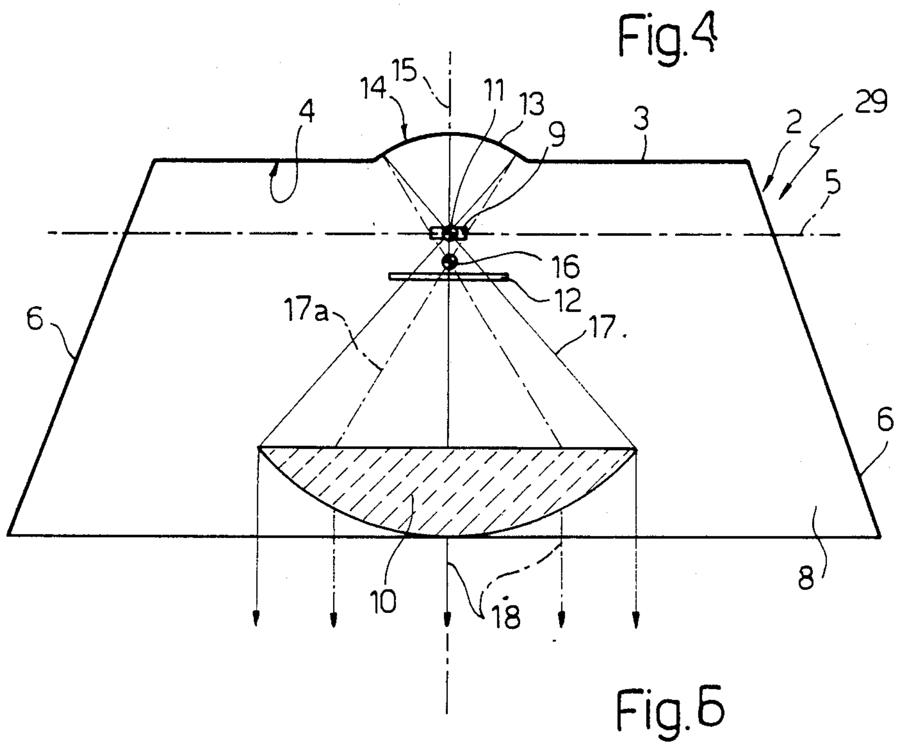
FIG. 5 shows a schematic view of the light pattern produced by the FIG. 1 headlight.
Figure 5:
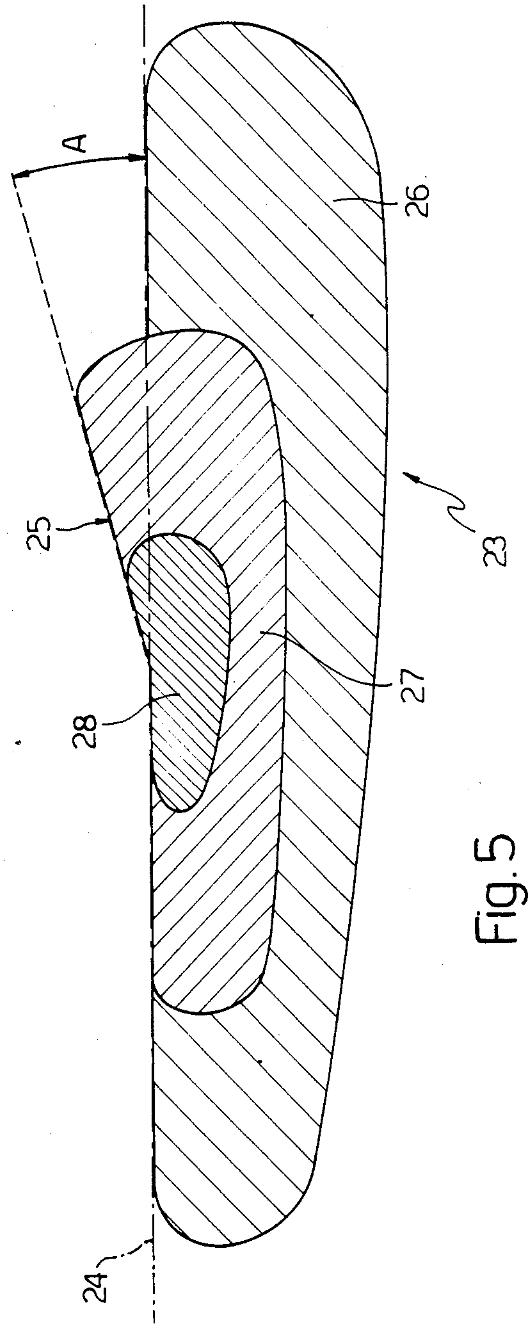

FIG. 5 shows the light pattern 23 produced by the beam emitted, in use, by headlight 1 on a screen perpendicular to axis 15.

Light pattern 23 is of relatively elongated shape along a substantially horizontal axis 24, and presents a top edge coinciding partly with axis 24 and comprising a portion 25 sloping upwards from axis 24 and defining an angle A, usually of 15°, depending on the shape of the periphery of diaphragm 12.

Light pattern 23 presents three zones: a first, 26, extending substantially over the entire surface of pattern 23 and formed by rays 21 and 22; a second, 27, partially overlapping zone 26 and formed by direct rays 18; and a third, 28, overlapping the central portion of zone 27 and formed by the virtual image produced by reflector 14.

In connection with the above, it should be pointed out that the closer focus point 16 is to diaphragm 12 the more sharply portion 25 will be defined, which focus point 16 must always be located a given distance from diaphragm 12 to prevent the light emitted by said virtual image from being fully intercepted by diaphragm 12.

To improve the definition of portion 25, FIG. 6 shows a variation headlight 29 substantially identical to headlight 1 except that, whereas focus point 11 is located as on headlight 1, at the intersection of axes 5 and 15, focus point 16, instead of coinciding with focus point 11, is located on the portion of axis 15 extending between axis 5 and diaphragm 12.

What is claimed:

1. A motor vehicle headlight comprising a reflecting body (2), in turn comprising a paraboloid of translation (4) with inclined lateral end walls (6), and a light source (9) located centrally along the focal axis (5) of said paraboloid (4); characterised by the fact that it also comprises a spherical reflector (14) formed centrally on said paraboloid (4) and behind said light source (9); a condensing lens (10) located ahead of said light source (9); and a diaphragm (12) located between said condensing lens (10) and said light source (9); the respective focus points (11, 16) of said condensing lens (10) and said spherical reflector (14) being located between said diaphragm (12) and said light source (9).

2. A headlight as claimed in claim 1, characterised by the fact that said two focus points (11, 16) substantially coincide with said light source (9).

3. A headlight as claimed in claim 1 characterised by the fact that said reflecting body (2) comprises a parabolic rear wall (3) defining said paraboloid of translation (4); a spherical recess (13) being formed centrally on said rear wall (3) and defining said spherical reflector (14).

* * * * *

UNITED STATES PATENT AND TRADEMARK OFFICE
CERTIFICATE OF CORRECTION

PATENT NO. : 4,964,021

DATED : OCTOBER 16, 1990

INVENTOR(S) : VALTER MASIN

It is certified that error appears in the above-identified patent and that said Letters Patent is hereby corrected as shown below:

On the title page, please insert the following as item [30]:

-- FOREIGN APPLICATION PRIORITY DATA:
Italian Application Serial No. 53 549-B/88
dated November 22, 1988 --.

Signed and Sealed this

Twentieth Day of October, 1992

*Attest:*

DOUGLAS B. COMER

*Attesting Officer* *Acting Commissioner of Patents and Trademarks*